(12) United States Patent
Andersen

(10) Patent No.: US 6,170,975 B1
(45) Date of Patent: Jan. 9, 2001

(54) MULTI-SHAFT EXTRUDER KNEADING DISCS, KNEADING DISC BLOCKS AND EXTRUDER

(75) Inventor: Paul Andersen, Warwick, NY (US)

(73) Assignee: Krupp Werner & Pfleiderer, Ramsey, NJ (US)

( * ) Notice: Under 35 U.S.C. 154(b), the term of this patent shall be extended for 0 days.

(21) Appl. No.: 09/295,945

(22) Filed: Apr. 21, 1999

Related U.S. Application Data

(63) Continuation-in-part of application No. 09/246,362, filed on Feb. 8, 1999.

(51) Int. Cl.$^7$ .................................................. B29B 7/48
(52) U.S. Cl. .................................................. 366/82; 366/85
(58) Field of Search ........................... 366/79–85, 88–90, 366/301; 425/204, 208, 209

(56) References Cited

U.S. PATENT DOCUMENTS

| | | | |
|---|---|---|---|
| 3,146,493 | * | 9/1964 | Steinle et al. ........................... 366/82 |
| 3,195,868 | * | 7/1965 | Loomans et al. ....................... 366/85 |
| 3,608,868 | * | 9/1971 | Koch ....................................... 366/82 |
| 4,236,833 | * | 12/1980 | Blach ..................................... 366/85 |
| 4,752,135 | * | 6/1988 | Loomans .............................. 425/209 |

FOREIGN PATENT DOCUMENTS

| 6-143388 | * | 5/1994 | (JP) ....................................... 366/82 |
|---|---|---|---|
| 1606171 | * | 11/1990 | (SU) ...................................... 366/85 |

* cited by examiner

*Primary Examiner*—Charles E. Cooley
(74) *Attorney, Agent, or Firm*—Robert F. I. Conte; Lee, Mann, Smith, McWilliams, Sweeney & Ohlson

(57) ABSTRACT

There is provided a multi-shaft kneading disc, kneading disc block, and a multi-shaft extruder containing the same. The kneading disc and each kneading disc in the kneading disc block having a disc shape with a central section defining an extruder shaft mounting bore and at least one lobe extending radially from said central section and having a crest end. The at least one lobe has a radius X which defines an outer diameter of the kneading disc. The central section has a radius Y which defines an inner diameter of the kneading disc. At least one other lobe extends radially from the central section and has a radius Z. The radius Z defines the outer diameter of at least one other lobe. The radius Z of the other lobe is equal to $Y+\frac{7}{8}(X-Y)$ to $Y+\frac{1}{4}(X-Y)$.

26 Claims, 6 Drawing Sheets

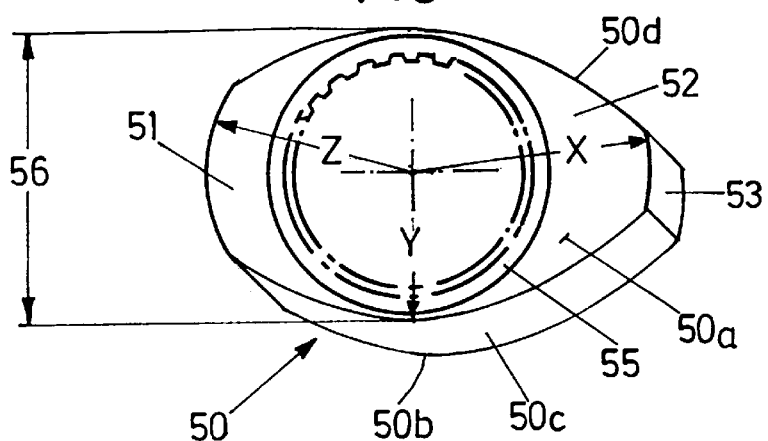
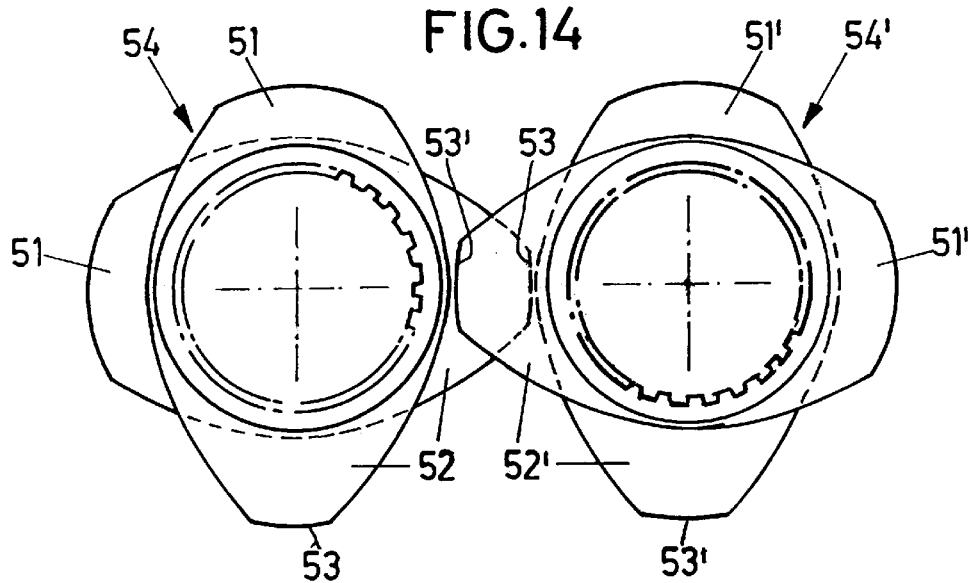
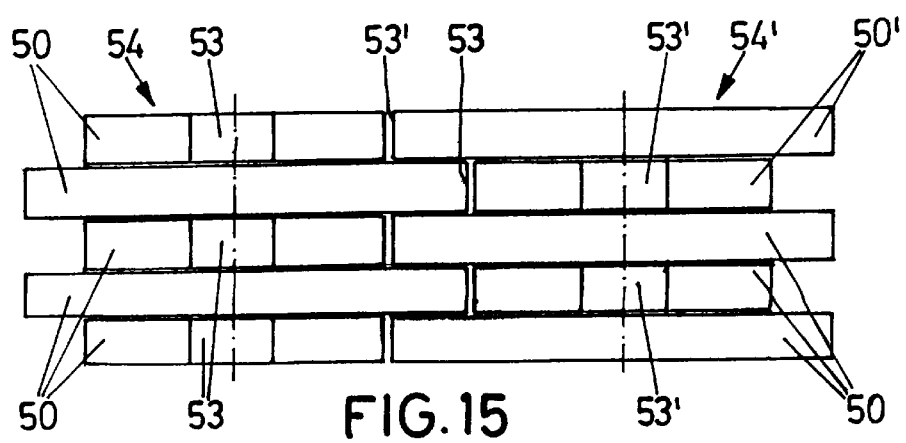

MULTI-SHAFT EXTRUDER KNEADING DISCS, KNEADING DISC BLOCKS AND EXTRUDER

This application is a continuation-in-part of my pending application Ser. No. 09/246,362 filed on Feb. 8, 1999.

BACKGROUND OF THE INVENTION

1. Field of the Invention

The present invention relates to multi-shaft extruder kneading discs and kneading blocks for kneading material in a multi-shaft extruder and to a multi-shaft extruder containing the same. More particularly, the present invention relates to kneading discs and kneading blocks wherein each of the kneading discs has a plurality of lobes with at least one of the lobes having a radius less than another lobe.

2. Background Art

Kneading discs for twin-screw extruders are well known. Generally, the kneading discs have 2 to 3 kneading lobes the length of the bushing. The crests of the kneading lobes are generally flat in the radial direction, but do have an arcuate shape in the circumferential direction. These prior art kneading discs are usually manufactured such that side by side kneading discs interact with each other when mounted in a twin screw extruder as kneading blocks. The number of discs in a kneading block are generally 4, 5 and 7. That is, the typical two diametrically opposed lobe kneading discs has the discs oriented at 60 degrees to each other in a 4 disc block; at 45 degrees or 90 degrees to each other in a 5 disc block, and at 30 degrees to each other in a 7 disc block.

The kneading discs have an upper face and a parallel lower face which are substantially mirror images of each other. Lateral side walls join the upper and lower faces. The discs generally have an annular central region with two or three lobes radially extending from the central region. The crests of the lobes are generally truncated. The kneading blocks generally have the discs arranged thereon so that they are in balance.

By increasing torque capacity and available rpm (speed), the capacity of an extrusion production line has been increased without increasing extruder size (diameter). However, an increase in speed has resulted in higher material temperature. (For a more detailed commentary on this issue, please refer to the '97 Antic paper "Understanding High Rate and High RPM Compounding on co-Rotating Twin-Screw Extruders.) As rpm is increased, the material will, at some point, reach a temperature where the polymer will start to degrade.

Temperature is generated by the deformation of material as a consequence of energy input. This energy input results from the shear generated as: (1) two discs (each disc is on a different screw shaft) pass each other going in opposite directions, (2) the lobe crest of one element disc wipes the root of the other, and (3) the lobe crests of two discs approach each other in the area of the screw channel known as the apex region. In the apex, an open surface of a small but not inconsequential area is reduced to virtually zero area during the disc rotation. In the standard full diameter kneading block element, all three of these actions, as well as the pushing of material in a circumferential motion by the disc lobe crest, contribute to material deformation and an associated temperature rise.

SUMMARY OF THE INVENTION

It is an aspect of the invention to provide a disc geometry that would reduce temperature rise and allow even higher rpm and throughput rates.

It is another aspect of my invention to relieve all of the apex area reduction in 3 of the 4 occurrences during a full revolution. My kneading discs are preferably in a fixed series for ease of assembly on the screw shafts. The number of discs in the series or kneading block is typically the amount needed so that the rotation between each disc results in a progression through 180 degrees or 360 degrees from beginning to the end of the disc. The number is typically 5 or 7. Five if the stagger angle is 45 degrees or 90 degrees, and seven for 30 degrees.

It is still another aspect of the present invention to provide a multi-shaft extruder kneading disc having a disc shape with a central section defining an extruder shaft mounting bore and at least one lobe extending radially from said central section and having a flat crest end. The at least one lobe having a radius X which defines an outer diameter of the kneading disc. The central section having a radius Y which defines an inner diameter of the kneading disc. At least one other lobe extending radially from the central section and having a radius Z which defines the outer diameter of the other lobe. The radius Z of the other lobe which defines the outer diameter of the other lobe is equal to $Y+\frac{7}{8}(X-Y)$ to $Y+\frac{1}{4}(X-Y)$.

My kneading disc is one where one lobe has a reduced length or radius such that it was a height above the root diameter approximately equal to $\frac{1}{4}$ to $\frac{7}{8}$ of the channel depth. The shape of the tip of this reduced lobe is still rounded, and in a preferred embodiment, an arc of a circle of a screw diameter reduced by approximately 2 times the depth of the disc reduction. This, however, is not a requirement. The progression of the tip reduction can proceed uniformly in the direction of disc stagger, opposite to disc stagger. This is not a preferred embodiment since it creates an unbalanced geometry for rotation around an axial center. No matter what the stagger angle, the progression of reduced tips should be such that a reduced tip at an angle has a corresponding tip reduction at 180 degree rotation at the same point on the element. This is best achieved with a random pattern. With an odd number of discs, as is typically required, there will always be one disc of unbalance, but this is a minimal value.

The above has referred to two lobe, lens shape, screw cross-section geometry. The same can be applied to three lobe, triangular shape, screw cross-section geometry.

The kneading discs have an outer diameter and an inner diameter with the disc having a bore to attach the disc to a drive shaft. The upper and lower faces are substantially mirror images of each other and generally extend parallel to each other. The central annular section and two lobes are joined by two lateral side walls that taper towards each other and are joined at both ends of the disc. The first lobe has a truncated or flat crest and the second lobe has a rounded crest. Generally, two or more of my kneading blocks are placed end to end on each side by side extruder drive shaft in a 90 degree orientation.

My kneading disc preferably is constructed to have at least one normal size lobe extending from the central region and at least another lobe having a radius reduced by $\frac{1}{8}$ to $\frac{3}{4}$ of the channel depth with respect to the radius of the normal size lobe. That is, in a two lobe kneading disc, the first lobe has the normal radius and the second lobe has a radius equal to $Y+\frac{1}{4}$ (channel depth) to $Y+\frac{7}{8}$ (channel depth). In a three lobe kneading disc having my configuration, the first and second lobes have the normal radius and the third lobe the reduced radius; or the first lobe has the normal radius and both the second and third lobes have the reduced radius.

The kneading discs are described as being applicable for a twin-screw extruder. However, the kneading disc may be used with an extruder having more than two side by side screws or shafts (multi-screw or multi-shaft extruder).

My kneading discs are constructed such that when they are mounted on the shafts of the multi-shaft extruder, they are non-rotatable relative to their respective shaft. This is done by splines or key joints on the bushing and the corresponding shaft. Some of the known construction has 24 splines, 6 splines, two keys and a single key.

Another aspect of the invention is to provide a multi-shaft extruder having a plurality of kneading discs each having a disc shape with a central section defining an extruder shaft mounting bore and at least one lobe extending radially from said central section and having a flat crest end. The at least one lobe having a radius X which defines an outer diameter of the kneading disc. The central section having a radius Y which defines an inner diameter of the kneading disc. At least one another lobe extending radially from the central section and having a radius Z which defines the outer diameter of the other lobe. The radius Z of the another lobe which defines the outer diameter of the second lobe is equal to $Y+\frac{7}{8}(X-Y)$ to $Y+\frac{1}{4}(X-Y)$.

Further aspects and advantages of the invention will become apparent from the following embodiment taken in conjunction with the drawings.

BRIEF DESCRIPTION OF THE DRAWINGS

FIG. 13 is a top view of the kneading disc of the present invention.

FIG. 14 is a top view of a pair of kneading blocks of the present invention in 90 degree orientation.

FIG. 15 is front view of the kneading block of FIG. 14.

DETAILED DESCRIPTION OF THE DRAWINGS AND THE PREFERRED EMBODIMENT

Figure 1:
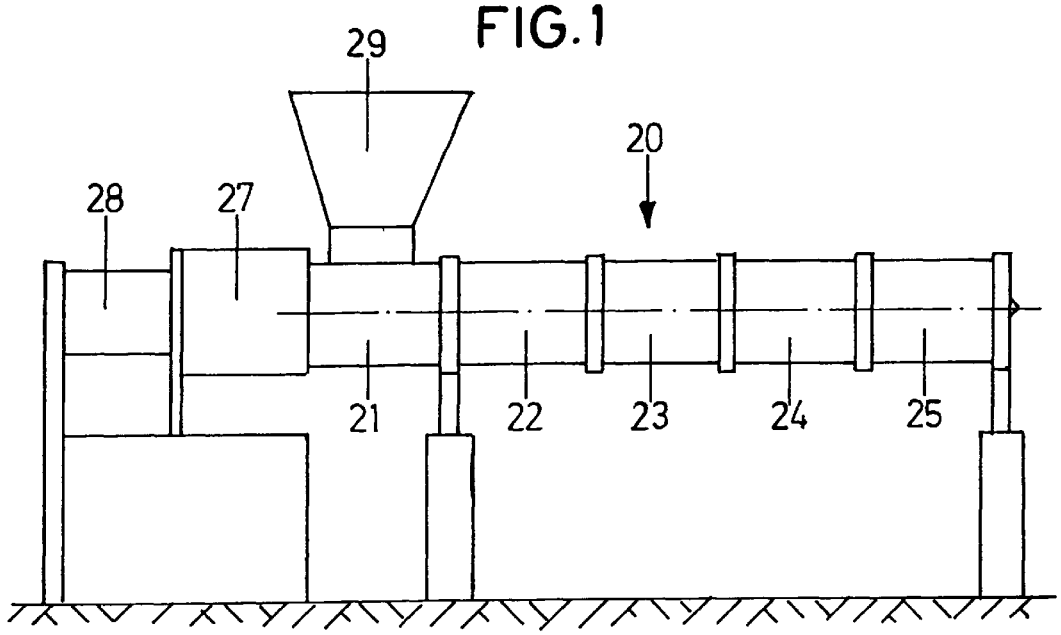
FIG. 1 is a diagrammatic view of a multi-screw type extruder in which the kneading discs and blocks of the present invention are used.
Figure 2:
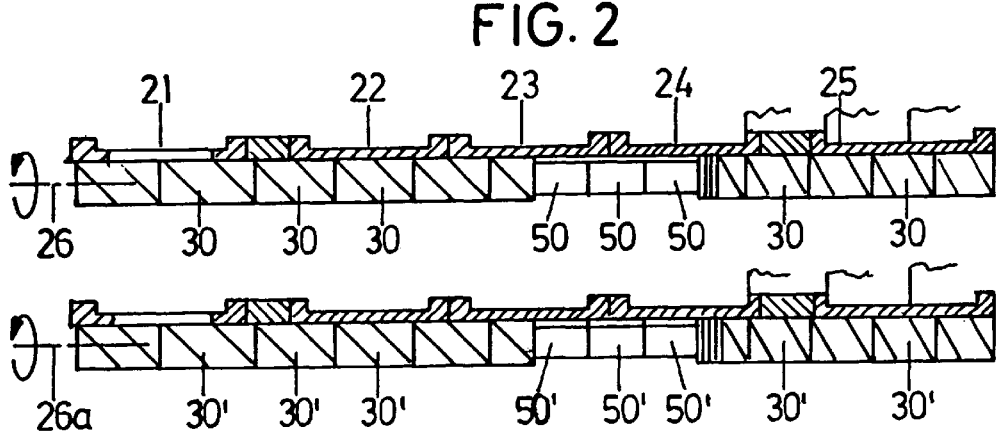
FIG. 2 is a diagrammatic view of the sequence on a twin extruder of the various known conveying elements and the kneading discs and blocks of the present invention.

FIGS. 1 and 2 are examples of a twin screw extruder 20. This type of extruder has a plurality of sections 21, 22, 23, 24 and 25 which are disposed axially one behind the other and flanged to one another. Two side by side shafts 26 and 26a are located in the housing which are driven via a gearbox 27 by a motor 28. The material to be extruded is fed by feed zone 29 to conveying screw section 21. Sections 21, 22, 25 and a portion of 23 and 24, contain a plurality screw conveying bushings 30 and sections 23 and 24 contain a plurality of my kneading blocks.

Figure 3:
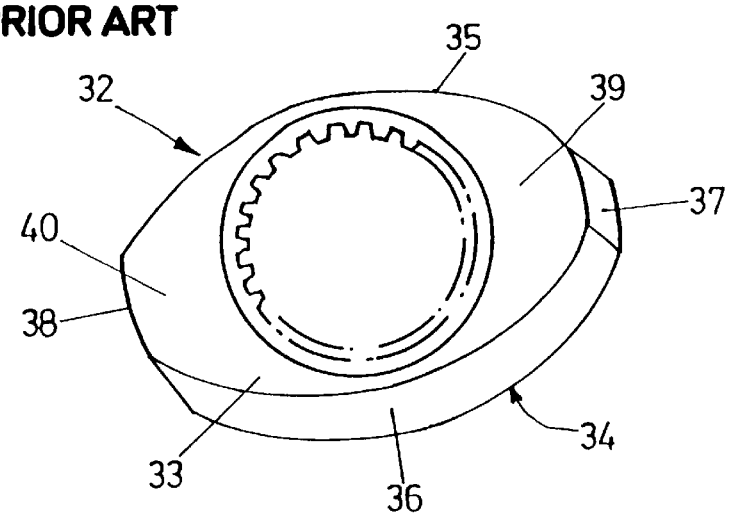
FIG. 3 is a top front perspective view of one of the kneading discs of FIG. 4.

FIG. 3 illustrates one of the well known kneading discs 32 generally used. This kneading disc has a central cylindrical region defining a bore that has splines for mounting the disc to the shaft of the extruder. The shaft of the extruder of course has corresponding splines so that the kneading disc does not rotate relative to but with the shaft. The kneading disc 32 has two generally parallel opposing top and bottom surfaces 33 and 34 in mirror image with each other and two opposing lateral side walls 35 and 36. The side walls 35 and 36 join the top and bottom surfaces and the side walls taper toward each other to form the diametric opposite ends or crests 37 and 38 of the kneading disc. Two lobes 39 and 40 extend radially in diametric opposite directions from the central cylindrical region. Each of the lobe ends is a flat crest 37, 38.

Figure 4:
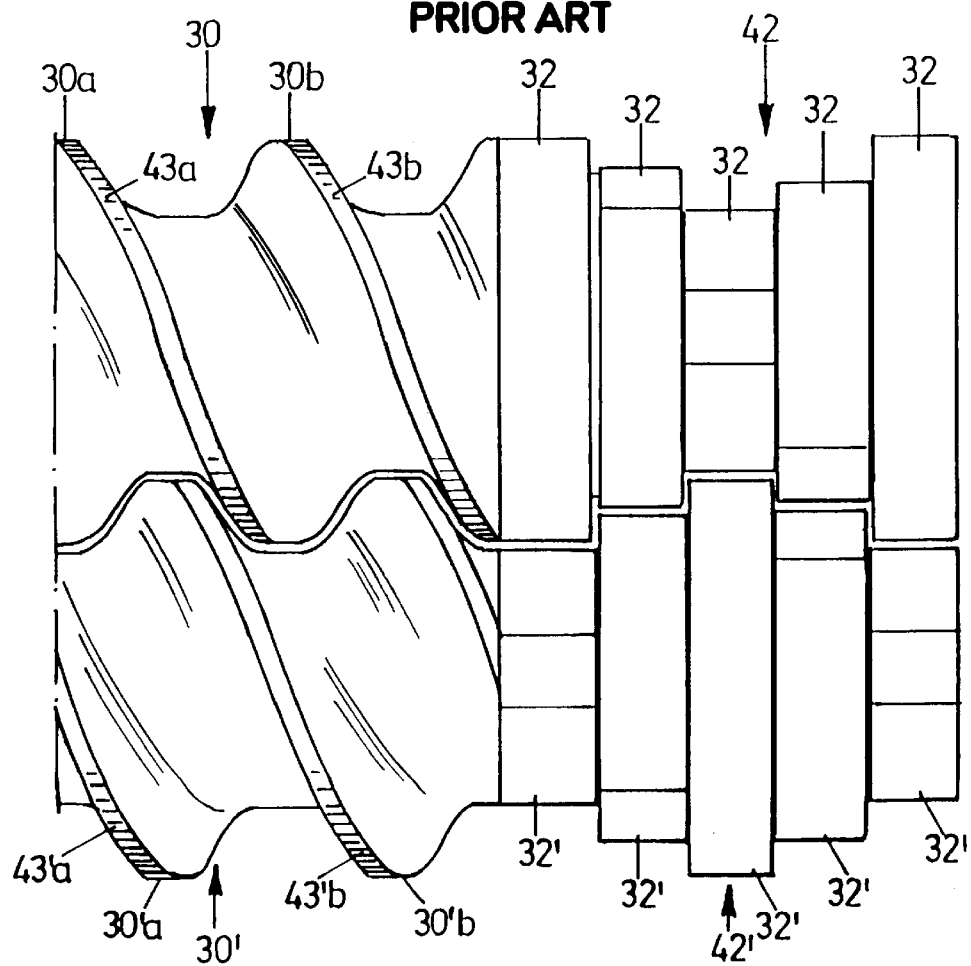
FIG. 4 is top perspective view of a side by side pair of prior art twin screw bushings connected to a side by side pair of prior art kneading blocks.

FIG. 4 shows a top view of a prior art pair of twin screw bushings 30 and 30' and a pair of twin kneading blocks 42, 42' as they would be connected end to end and side by side in a twin screw extruder. The twin screw bushing 30 is a 2-flighted screw bushing that has a pair of helically extending screw elements 30a and 30b. The 2-flighted twin screw bushing 30' has a pair of helically extending screw elements 30'a, 30'b. Each of the screw elements has a flat helical crest 43a, 43b, 43'a, 43'b. The screw bushings 30 and 30' are identical to each other and as shown in FIG. 4 they are at 90 degree orientation.

The kneading blocks 42 and 42' are identical and are at a 90 degree orientation to each other. Each of the kneading blocks has five identical kneading discs 32, 32'. The five discs in each block are oriented at 45° to each other.

Figure 5:
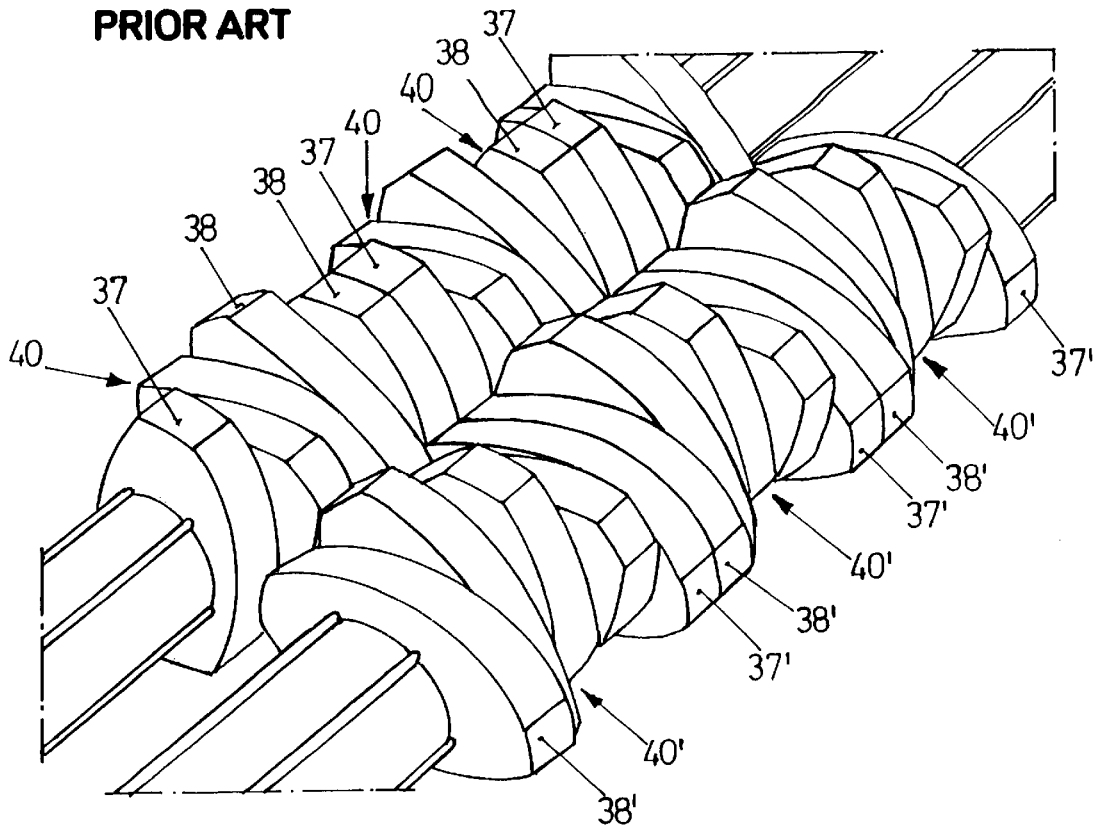
FIG. 5 is a perspective view of prior art kneading blocks on the side by side twin extruder shafts.

FIG. 5 shows 3 pairs of kneading blocks 42, 42' mounted on the twin screw shafts 40, 40'.

Figure 6:
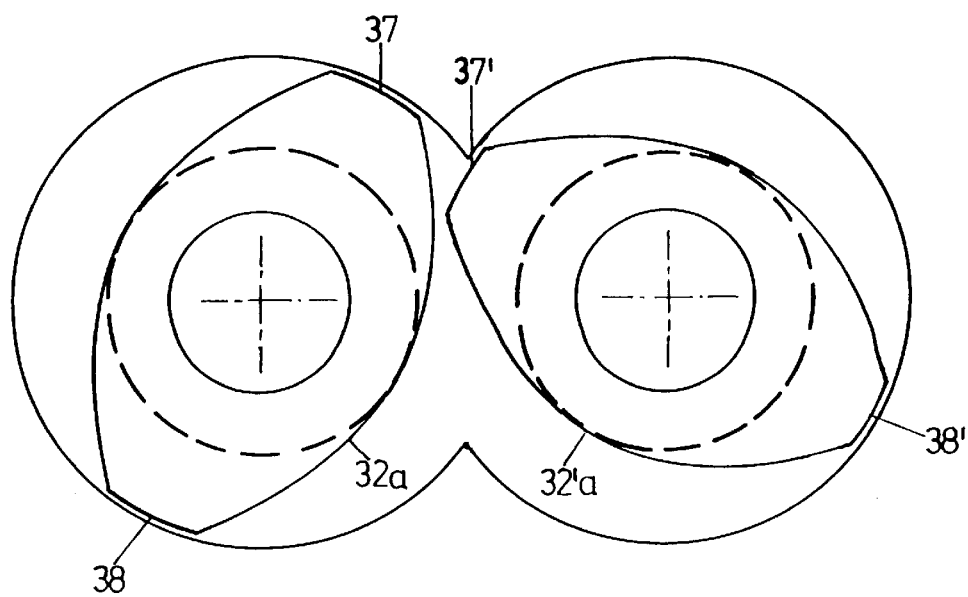
FIG. 6 diagrammatically illustrates the working principles of the kneading blocks of FIG. 5.

FIG. 6 shows the lobe crests 37, 37' pass each other going in the opposite direction with the crest 37' wiping the root 32a and the crest 38 wiping the root 32'a and the lobe crest 37 approaches lobe crest 37' in the apex region.

Figure 7:
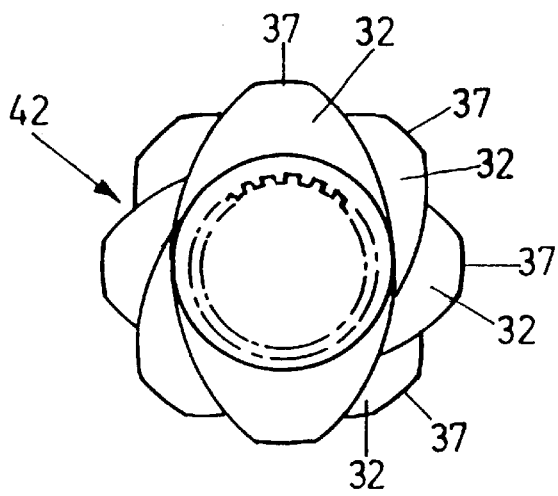
FIGS. 7–12 are illustrations of the prior art kneading block geometrics.
Figure 8:
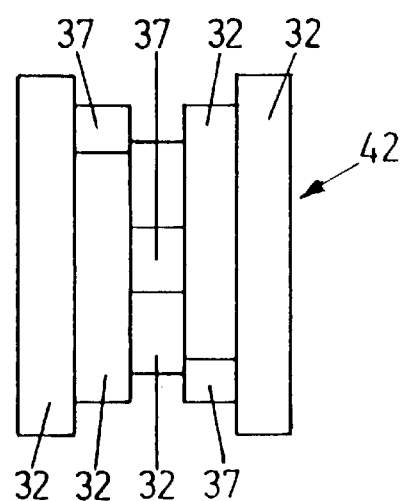
Figure 9:
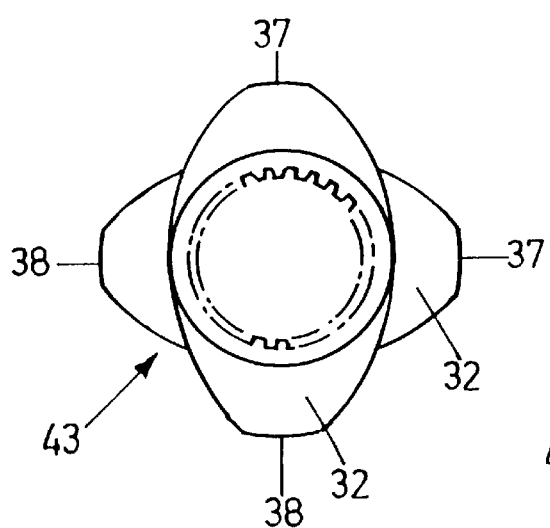
Figure 10:
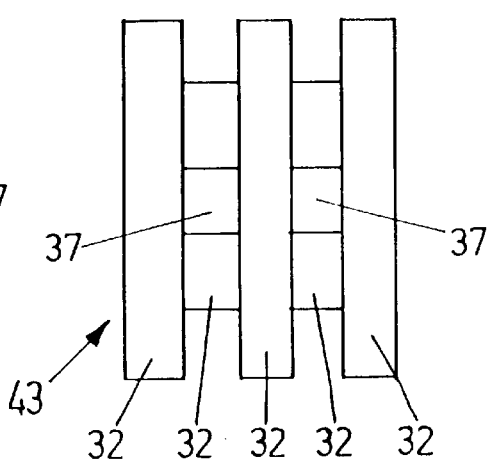

Referring to FIGS. 7–12, there is shown various kneading block configurations. FIGS. 7 and 8 show the kneading block 42 having five identical discs 32 oriented at 45 degrees to each other. FIGS. 9 and 10 show the kneading block 43 having five identical discs 32 oriented at 90 degrees to each other.

Figure 11:
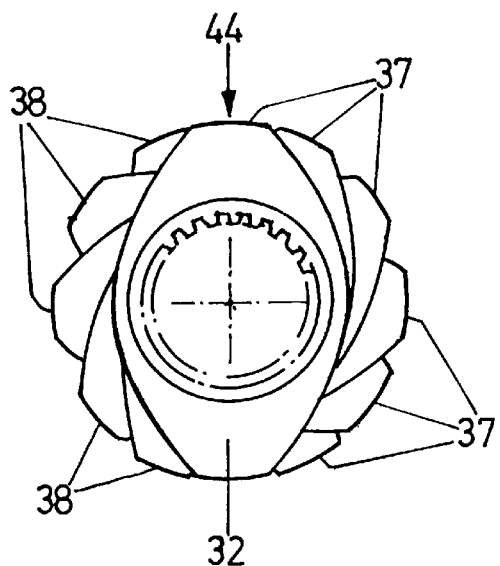
Figure 12:
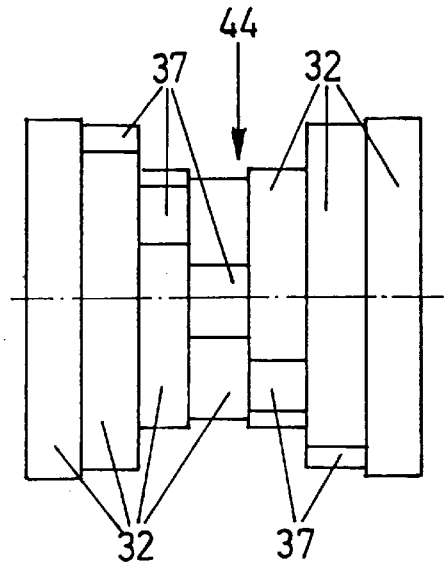

FIGS. 11 and 12 show kneading block 44 having seven identical discs 32 oriented at 30 degrees to each other.

Referring to FIG. 13, there is shown my improved kneading disc 50. My kneading disc 50 has an upper surface 50a and a parallel lower surface 50b that are substantially mirror images of each other and generally extend parallel to each other. The two surfaces 50a and 50b are joined by two lateral side walls 50c and 50d that taper towards each other and are joined at both ends of the disc. The lobes radially extend from the annular section. My kneading disc 50 has basically the same configuration as kneading disc 32 except a portion of lobe 39 is eliminated so as to provide the lobe 51 that has a radius or length that is less than the radius of lobe 52. Lobe 52 has a crest 53 and a cylindrical central region 55.

Referring to FIGS. 14 and 15, each kneading block 54,54' has five of the kneading discs 50, 50' each stacked in 90 degree rotation such that all the kneading discs alternate between having the crests 53 being at 0 degrees or 90 degrees. For instance, if the first, third and fifth kneading have their crests 53 facing 0 degrees, the second and fourth kneading discs have their crests 53 facing 90 degrees.

The preferred orientation for the twin screw extruder is to have a pair of side by side kneading blocks 50, 50'. The first kneading block 50 has the crest 53 of the first kneading disc facing 0 degrees. The second kneading block 50' has the crest 53' of its first kneading disc facing the first kneading block at 90 degrees to the crest 53 of the first kneading disc.

The preferred disc arrangement of each of the kneading blocks is to have 5 or 7 stacked kneading discs.

The lobe 52 provides the outer diameter of the kneading disc and has a radius X. The inner diameter 56 of the kneading disc has a radius Y. The extruder flow channel height of the extruder is the distance between the inner walls of the kneading block housing and the inner diameter of the kneading disc. The radius of the lobe 51 is preferably $Y+\frac{1}{2}(X-Y)$ but can vary from $Y+\frac{7}{8}(X-Y)$ to $Y+\frac{1}{4}(X-Y)$.

Figure 16:
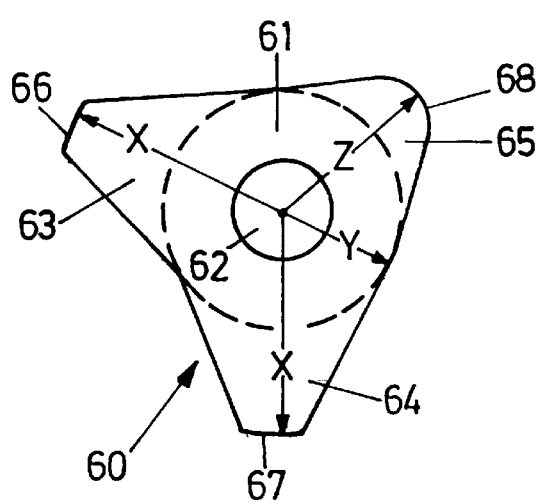
FIG. 16 is a top view of another kneading disc of the present invention.

FIG. 16 shows a kneading disc 60 having an annular central section 61 having a central bore 62, two normal sized lobes 63, 64, and one shorter lobe 65. The lobes 63 and 64 define the outer diameter of the disc 60. The lobes 63, 64 both have a radius X and the lobe 65 has radius Z. The lobes 63, 64 have truncated crests 66, 67 respectively. The end of the lobe 65 has an arc 68. The disc 60 has an inner diameter having a radius Y. The radius Z of the shorter lobe 65 is equal to from $Y+\frac{7}{8}(X-Y)$ to $Y+\frac{1}{4}(X-Y)$.

Figure 17:
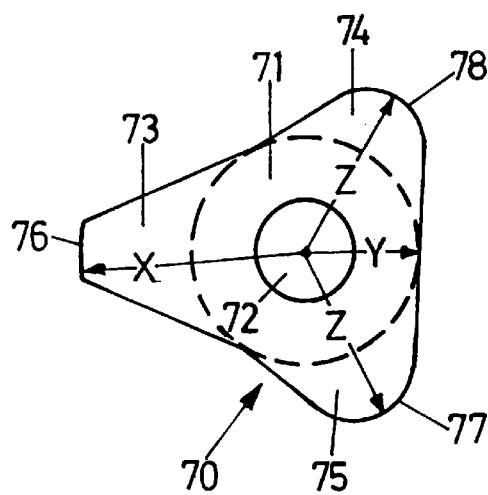
FIG. 17 is a top view of still another kneading disc of the present invention.

FIG. 17 shows a kneading disc 70 having a annular central section 71 having a central bore 72, one normal sized lobe 73 and two shorter lobes 74, 75. The lobe 73 defines the outer diameter of the disc 70. The lobe 73 has a radius X and the lobes 74, 75 have a radius Z. The lobe 73 has a truncated crest 76. The ends of the lobes 74, 75 each have an arc 78. The disc 70 has an inner diameter having a radius Y. The radius Z of the shorter lobes 74 or 75 is equal to from $Y+\frac{7}{8}(X-Y)$ to $Y+\frac{1}{4}(X-Y)$.

The invention is not restricted to the above-described embodiments, but modifications and variations may be made without departing from the spirit and scope of the invention as defined by the appended claims.

What is claimed is:

1. A multi-shaft extruder kneading disc having a disc shape comprising a central section defining an extruder shaft mounting bore, at least one lobe extending radially from said central section and having a crest end, said at least one lobe having a radius X which defines an outer diameter of the kneading disc, said central section having a radius Y which defines an inner diameter of said kneading disc, at least one other lobe extending radially from said central section and having a radius Z which defines the outer diameter of said at least one other lobe, and the radius Z of said at least one other lobe is equal to $Y+\frac{7}{8}(X-Y)$ to $Y+\frac{1}{4}(X-Y)$.

2. The disc of claim 1 wherein the radius Z is $Y+\frac{1}{2}(X-Y)$.

3. The disc of claim 2 wherein there are two lobes extending diametrically opposite each other.

4. The disc of claim 2 wherein there are three lobes with a first lobe having the radius X and said second and third lobes having the radius Z.

5. The disc of claim 2 wherein there are three lobes with a first and a second lobe having the radius X and a third lobe has the radius Z.

6. The disc of claim 1 wherein there are two lobes extending diametrically opposite each other.

7. The disc of claim 1 wherein there are three lobes with a first lobe having the radius X and said second and third lobes having the radius Z.

8. The disc of claim 1 wherein there are three lobes with a first and a second lobe having the radius X and a third lobe has the radius Z.

9. A multi-shaft extruder kneading block having a plurality of kneading discs arranged to provide a kneading block for a multi-shaft extruder comprising:

each said kneading disc having a disc shape with a central section defining an extruder shaft mounting bore, at least one lobe extending radially from said central section and having a crest end, said at least one lobe having a radius X which defines an outer diameter of the kneading disc, said central section having a radius Y which defines an inner diameter of said kneading disc, at least one other lobe extending radially from said central section and having a radius Z which defines the outer diameter of said at least one other lobe, and the radius Z is equal to $Y+\frac{7}{8}(X-Y)$ to $Y+\frac{1}{4}(X-Y)$.

10. The kneading block of claim 9 wherein the radius Z is $Y+\frac{1}{2}(X-Y)$.

11. The kneading block of claim 10 comprising 5 or 7 identical kneading discs.

12. The kneading block of claim 11 wherein each said kneading disc has two lobes extending diametrically opposite each other.

13. The kneading block of claim 11 wherein each said kneading disc has three lobes with a first lobe having the radius X and second and third lobes having the radius Z.

14. The kneading block of claim 11 wherein each said kneading disc has three lobes with a first and a second lobe having the radius X and a third lobe has the radius Z.

15. The kneading block of claim 9 wherein each said kneading disc has two lobes extending diametrically opposite each other.

16. The kneading block of claim 9 wherein each said kneading disc has three lobes with a first lobe having the radius X and second and third lobes having the radius Z.

17. The kneading block of claim 9 wherein each said kneading disc has three lobes with a first and a second lobe having the radius X and a third lobe has the radius Z.

18. The kneading block of claim 9 comprising 5 or 7 identical kneading discs.

19. A multi-shaft extruder comprising:

a pair of side by side drive shafts, a plurality of kneading discs mounted on each drive shaft in side by side kneading relationships, each said kneading disc having a central section defining an extruder shaft mounting bore, each said kneading disc having at least one lobe extending radially from said central section and having a crest end, said at least one lobe having a radius X which defines an outer diameter of the kneading disc, said central section having a radius Y which defines an inner diameter of said kneading disc, at least one other lobe extending radially from said central section and having a radius Z which defines the outer diameter of said at least one other lobe, and the radius Z is equal to $Y+\frac{7}{8}(X-Y)$ to $Y+\frac{1}{4}(X-Y)$.

20. The multi-shaft extruder of claim 19 wherein in each said kneading disc the radius Z is $Y+\frac{1}{2}(X-Y)$.

21. The multi-shaft extruder of claim 20 wherein each said kneading disc has two lobes extending diametrically opposite each other.

22. The multi-shaft extruder of claim 20 wherein each said kneading disc has three lobes with a first lobe having the radius X and said second and third lobes having the radius Z.

23. The multi-shaft extruder of claim 20 wherein each said kneading disc has three lobes with a first and a second lobe having the radius X and a third lobe has the radius Z.

24. The multi-shaft extruder of claim 19 wherein each said kneading disc has two lobes extending diametrically opposite each other.

25. The multi-shaft extruder of claim 19 wherein each said kneading disc has three lobes with a first lobe having the radius X and a second and a third lobe having the radius Z.

26. The multi-shaft extruder of claim 19 wherein each said kneading disc has three lobes with a first and a second lobe have the radius X and a third lobe has the radius Z.

* * * * *